UNITED STATES PATENT OFFICE.

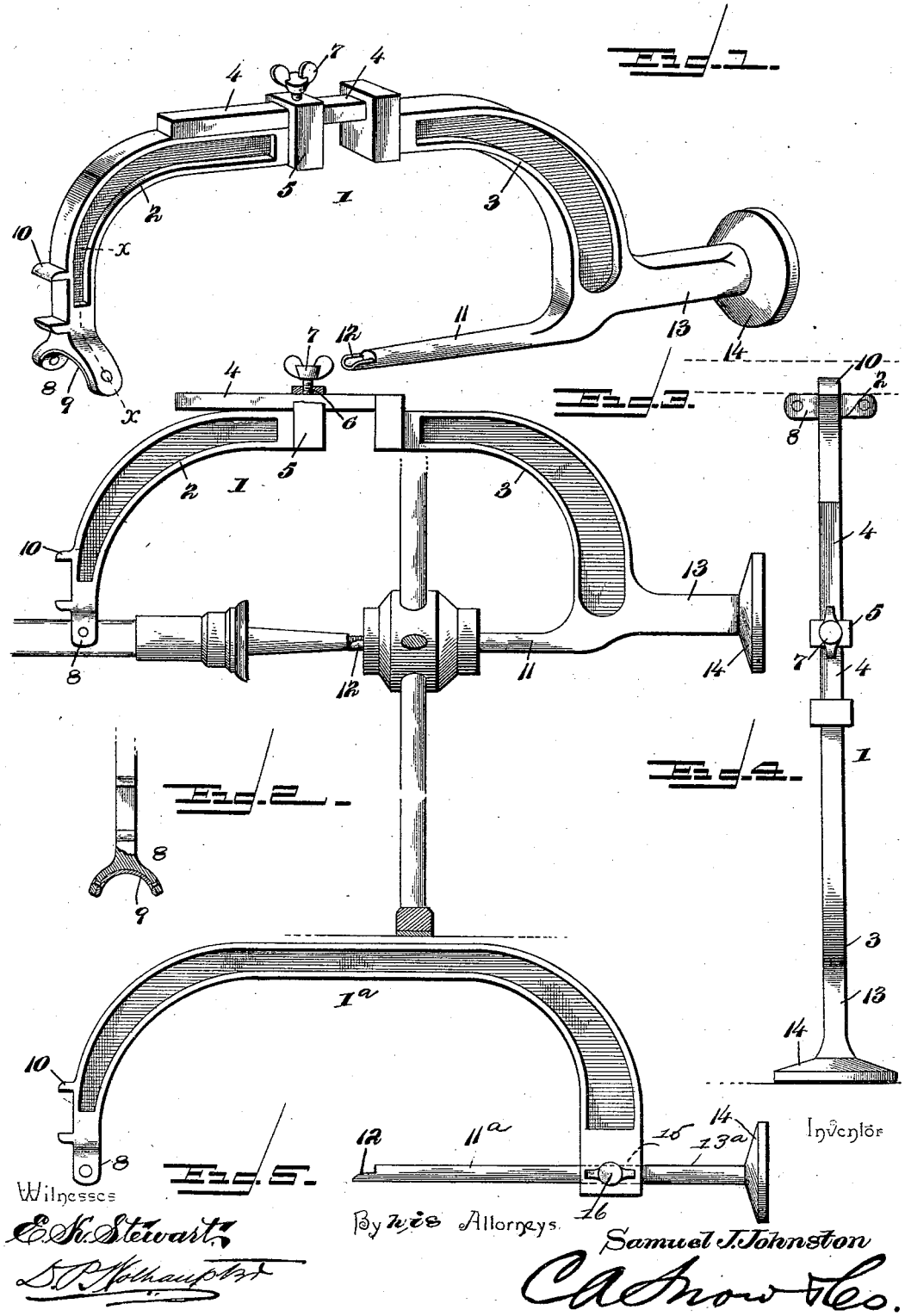

SAMUEL J. JOHNSTON, OF LEESBURG, VIRGINIA.

CARRIAGE OR WAGON JACK.

SPECIFICATION forming part of Letters Patent No. 530,109, dated December 4, 1894.

Application filed July 19, 1894. Serial No. 518,016. (No model.)

*To all whom it may concern:*

Be it known that I, SAMUEL J. JOHNSTON, a citizen of the United States, residing at Leesburg, in the county of Loudoun and State of Virginia, have invented a new and useful Carriage or Wagon Jack, of which the following is a specification.

This invention relates to carriage and wagon jacks; and it has for its object to provide an adjustable jack of this character adapted for use in connection with any sized hub, while at the same time providing simple and efficient means for supporting vehicle axles by means of the wheels themselves resting on the ground, while oiling the axles and removing or putting on washers, and also for the purpose of propping up the axle of vehicles as a lifting jack while washing wheels, &c.

With these and other objects in view, which will readily appear as the nature of the invention is better understood, the same consists in the novel construction, combination, and arrangement of parts hereinafter more fully described, illustrated, and claimed.

In the accompanying drawings:—Figure 1 is a perspective view of an adjustable carriage and wagon jack constructed in accordance with this invention. Fig. 2 is a detail sectional view on the line *x—x* of Fig. 1. Fig. 3 is a side elevation of the jack employed for supporting the axle of a vehicle and for holding the wheel, when the latter acts as the prop for the axle. Fig. 4 is a similar view of the jack employed as a direct prop for a vehicle axle. Fig. 5 is a side elevation of a modified construction of the jack.

Referring to the accompanying drawings, 1 designates a sectional bowed jack-arm that is adapted to be passed between the spokes of a vehicle wheel when the jack is employed for holding the wheel when slipped off the axle. The said sectional bowed jack arm consists of the separate curved members 2 and 3, that are adapted to be adjustably connected together at their inner adjacent ends, and the curved arm member 3, has projected from its outer side and beyond the inner end thereof the squared connecting bar 4, that is loosely received in the slide-loop 5, formed on the inner end of the arm member 2, and the outer side of said slide loop 5, is provided with a threaded opening 6, to receive the set screw 7, that impinges on the bar 4, to hold the arm members 2 and 3, properly spaced apart according to the length of jack required where the hub of a wheel is of a particular size.

The curved arm member 2, is provided at its outer extremity with the fulcrum fork 8, that is adapted to embrace the upper side of a vehicle axle in rear of the spindle thereof when the jack is passed between the spokes of a wheel, and said fork 8, is preferably faced with a leather or similar facing 9, to form a soft contact with the axle of the vehicle. Directly adjacent to the fulcrum fork 8, the inner end of the arm member 2, is further provided with the notched rest-lug 10, that is adapted to fit the under side of an axle when the jack is placed in an upright position for the purpose of acting as a prop for the axle to hold the wheel off of the ground. The opposite curved arm member 3, is provided at its outer extremity with the inwardly disposed jack spindle 11, the inner end of which is provided with a shoulder or lip 12, in which rests the tip extremity of the axle-spindle to which the jack is fitted, and directly opposite the jack spindle 11, the arm 3, has projected from its outer end the outer handle and foot arm 13, at the outer extremity of which is formed a flat rest base 14, to rest upon the ground when the jack is used as a prop.

In using the jack as shown in Fig. 3, of the drawings, when the same is positioned between the spokes of the wheel and properly adjusted to suit the size of the hub, the arm 13, is grasped and slightly raised so that the wheel may be slid off of the axle spindle and onto the jack spindle 11, in which position the wheel will act as a prop to support the axle spindle so that ready access may be had thereto for oiling and other purposes. When used as shown in Fig. 4, of the drawings, the jack is adjusted to any length desired and is set in an upright position with the base 14, on the ground and rest lug 10, under the vehicle axle to support the same.

Changes in the form, proportion and the minor details of construction may be resorted to without departing from the principle or sacrificing any of the advantages of this invention, and in Fig. 5, of the drawings, I have shown a modification of the jack that provides for the selfsame adjustment and consists of the same number of parts as the preferred form of jack herein described. In the modification the bowed jack-arm, designated as 1ª, is formed in one piece and is provided at the end opposite the fulcrum fork and the rest lug with a slide opening 15, in which is mounted for adjustment the combined jack-spindle and handle and foot arm, 11ª—13ª, formed in one piece and provided at the inner end with the shoulder or lip 12, and at the outer end with the rest base 14, already described. A set screw 16, holds the combined spindle and arm secured in its adjusted position.

Having thus described the invention, what is claimed, and desired to be secured by Letters Patent, is—

1. In a carriage and wagon jack, a sectional bowed jack arm consisting of separate curved members, and an adjustable connection between the inner ends of said members, substantially as set forth.

2. In a jack of the class described, a sectional bowed jack arm consisting of separate curved members, one of which is provided at its inner end with a connecting bar projected from one side, and the other of said members being provided at its inner end with a slide loop loosely receiving said connecting bar, and a set screw mounted in said slide loop and impinging on said connecting bar, substantially as set forth.

3. In a jack of the class described, the combination of a sectional bowed jack arm consisting of separate curved members adjustably connected together and one of which is provided at its outer end with a fulcrum fork and an adjacent notched rest lug, and the other of which arms is provided at its outer end with an inwardly disposed jack spindle and an outwardly disposed handle and foot arm having a flat rest base at its outer extremity, substantially as set forth.

4. A carriage or wagon jack made of two sections or members adjustably connected together and comprising a bowed jack arm provided at one end with a fulcrum rest and a rest lug, and at the opposite end with an inwardly disposed jack spindle, and a handle and foot arm having a rest base, substantially as set forth.

In testimony that I claim the foregoing as my own I have hereto affixed my signature in the presence of two witnesses.

SAMUEL J. JOHNSTON.

Witnesses:
 JOHN H. SIGGERS,
 GEO. C. SHOEMAKER.